United States Patent [19]

Simmons

[11] Patent Number: 4,769,846
[45] Date of Patent: Sep. 6, 1988

[54] SPEECH THERAPY VARIABLE CODE LEARNING TRANSLATOR

[76] Inventor: William F. Simmons, 541 March St., Shillington, Pa. 19607

[21] Appl. No.: 773,945

[22] Filed: Sep. 9, 1985

[51] Int. Cl.$^4$ .............................................. G10L 5/02
[52] U.S. Cl. ...................................... 381/51; 351/43; 364/513.5
[58] Field of Search .................. 381/43, 51; 364/513.5

[56] References Cited

U.S. PATENT DOCUMENTS

| | | | |
|---|---|---|---|
| 4,215,240 | 7/1980 | Ostrowski | 381/51 |
| 4,344,148 | 8/1982 | Brantingham et al. | 381/51 |
| 4,357,489 | 11/1982 | Henderson et al. | 381/51 |
| 4,384,170 | 5/1983 | Mozer et al. | 381/51 |
| 4,532,495 | 7/1985 | Gagnon | 381/51 |
| 4,563,770 | 1/1986 | Lemelson et al. | 381/51 |
| 4,589,138 | 5/1986 | Milner et al. | 381/51 |
| 4,661,916 | 4/1987 | Baker et al. | 364/513.5 |

*Primary Examiner*—Patrick R. Salce
*Assistant Examiner*—Anita M. Ault
*Attorney, Agent, or Firm*—William J. Ruano

[57] ABSTRACT

The Speech Therapy Translator converts minimal manipulations to aural conversation using basic words and statements necessary for rehabilitating patients who are speech handicapped. The system is also used for language and minor utterance translation. Applications in the fields of animal sound and language translation, Linguistic Anthropology, and aids to the permanently speech-handicapped are evident. The main feature of the system is that the sight sense is not needed for fluent conversation. There are three primary modes of operation.

The first mode is DC switch excitation. The switches are attached to the fingers, eyelids or convenient movable positions on the body. The second mode of operation utilizes audio microphone inputs. The microphones, with sufficient amplification, are sensitive to touch excitation. The microphones are also activated by various pulse-type sounds. These sounds are in the nature of clicks, whistles, or cricket sounds. The basic system contains two active coding channels and the sounds for this mode must be made directional. If the patient is incapable of any minor utterances, this mode could not be used. The third mode uses selective filters, external to the basic system. Preselected sounds such as (e) and (uh) excite the two channels of the system. The coding arrangement sets up the translation process from the step incrementing channel operation to the selected word in the voice synthesizer. This third mode may also contain phase time delay coding detection which is coded into the translation process. The third mode may be used for animal sound verses action response translation and applications in Linguistic Anthropology.

21 Claims, 5 Drawing Sheets

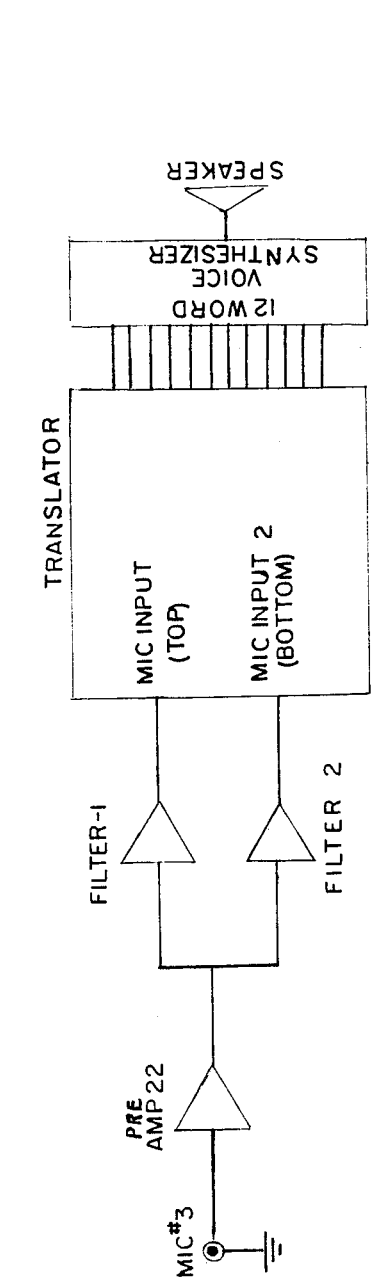
Fig.3
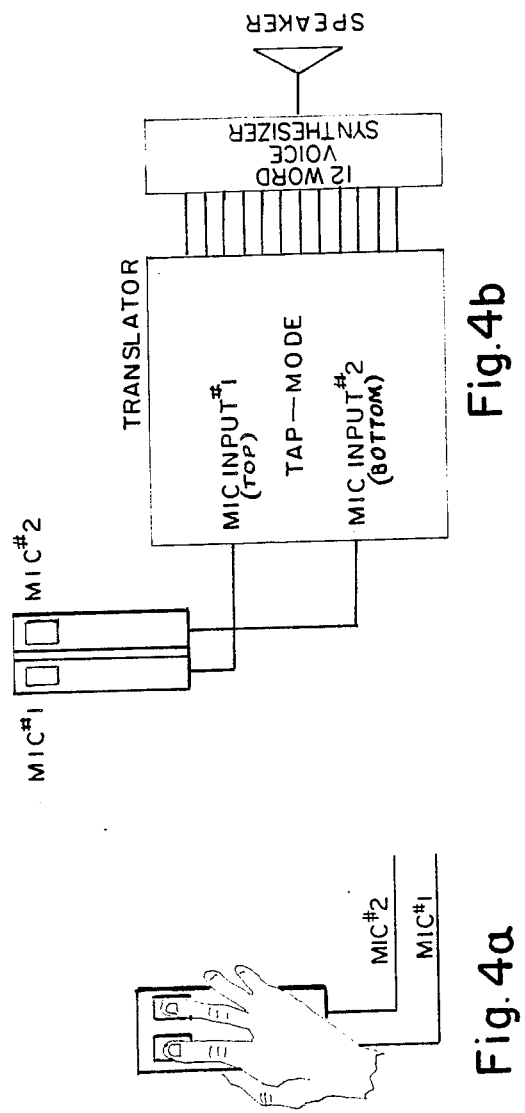
Fig.4b
Fig.4a
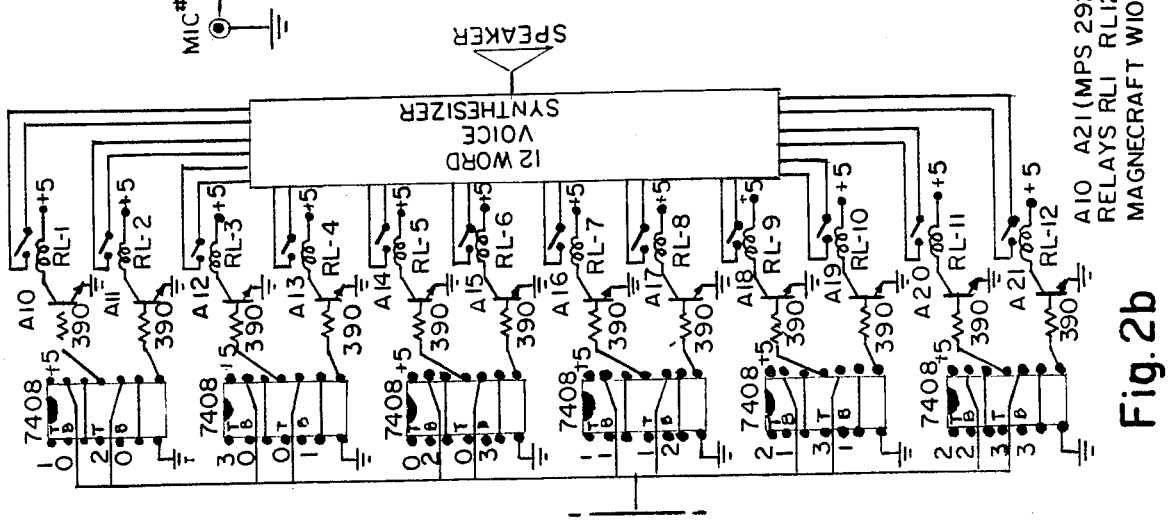
Fig.2b $4^2-1=15$

| CODE | | WORD |
|---|---|---|
| #1 | #2 | |
| 0 | 0 | R.S. |
| 0 | 1 | ARE |
| 0 | 2 | O |
| 0 | 3 | K |
| 1 | 0 | I |
| 1 | 1 | AM |
| 1 | 2 | WE |
| 1 | 3 | |
| 2 | 0 | SEE |
| 2 | 1 | YES |
| 2 | 2 | PEE |
| 2 | 3 | |
| 3 | 0 | YOU |
| 3 | 1 | EGGS |
| 3 | 2 | |
| 3 | 3 | AND |

Fig. 6A $5^2-1=24$

| CODE | | WORD |
|---|---|---|
| #1 | #2 | |
| 0 | 0 | R.S. |
| 0 | 1 | ARE |
| 0 | 2 | O |
| 0 | 3 | K |
| 0 | 4 | |
| 1 | 0 | I |
| 1 | 1 | AM |
| 1 | 2 | WE |
| 1 | 3 | |
| 1 | 4 | |
| 2 | 0 | SEE |
| 2 | 1 | YES |
| 2 | 2 | PEE |
| 2 | 3 | |
| 2 | 4 | |
| 3 | 0 | YOU |
| 3 | 1 | EGGS |
| 3 | 2 | |
| 3 | 3 | AND |
| 3 | 4 | |
| 4 | 0 | |
| 4 | 1 | |
| 4 | 2 | |
| 4 | 3 | |
| 4 | 4 | |

Fig. 6B $4^3-1=63$

| CODE | | | WORD |
|---|---|---|---|
| #1 | #2 | #3 | |
| 0 | 0 | 0 | R.S. |
| 0 | 0 | 1 | |
| 0 | 0 | 2 | |
| 0 | 0 | 3 | |
| 0 | 1 | 0 | ARE |
| 0 | 1 | 1 | |
| 0 | 1 | 2 | |
| 0 | 1 | 3 | |
| 0 | 2 | 0 | O |
| 0 | 2 | 1 | |
| 0 | 2 | 2 | |
| 0 | 2 | 3 | |
| 0 | 3 | 0 | K |
| 0 | 3 | 1 | |
| 0 | 3 | 2 | |
| 0 | 3 | 3 | |
| 1 | 0 | 0 | I |
| 1 | 0 | 1 | |
| 1 | 0 | 2 | |
| 1 | 0 | 3 | |
| 1 | 1 | 0 | AM |
| 1 | 1 | 1 | |
| 1 | 1 | 2 | |
| 1 | 1 | 3 | |
| 1 | 2 | 0 | WE |
| 1 | 2 | 1 | |
| 1 | 2 | 2 | |
| 1 | 2 | 3 | |
| 1 | 3 | 0 | |
| 1 | 3 | 1 | |
| 1 | 3 | 2 | |
| 1 | 3 | 3 | |
| 2 | 0 | 0 | SEE |
| 2 | 0 | 1 | |
| 2 | 0 | 2 | |
| 2 | 0 | 3 | |
| 2 | 1 | 0 | YES |
| 2 | 1 | 1 | |
| 2 | 1 | 2 | |
| 2 | 1 | 3 | |
| 2 | 2 | 0 | PEE |
| 2 | 2 | 1 | |
| 2 | 2 | 2 | |
| 2 | 2 | 3 | |
| 2 | 3 | 0 | |
| 2 | 3 | 1 | |
| 2 | 3 | 2 | |
| 2 | 3 | 3 | |
| 3 | 0 | 0 | YOU |
| 3 | 0 | 1 | |
| 3 | 0 | 2 | |
| 3 | 0 | 3 | |
| 3 | 1 | 0 | EGGS |
| 3 | 1 | 1 | |
| 3 | 1 | 2 | |
| 3 | 1 | 3 | |
| 3 | 2 | 0 | |
| 3 | 2 | 1 | |
| 3 | 2 | 2 | |
| 3 | 2 | 3 | |
| 3 | 3 | 0 | AND |
| 3 | 3 | 1 | |
| 3 | 3 | 2 | |
| 3 | 3 | 3 | |

Fig. 6C

ND TRANSLATOR

SUMMARY OF THE INVENTION

The Speech Therapy Translator is an immediate translator. Initial speeds are adjustable and will vary with improvement during the code-learning process. When used in speech therapy, the variable code-learning translator allows the patient to speak at rates conducive to the response capability of the patient and with external adjustments will increase speaking rates as the patient improves. A patient incapable of speaking may speak with normal conversation by manipulating touch switches, tapping, or uttering almost inaudible grunts or clicks into a throat microphone. The system is basic and will translate animal gibberish to English or any other language. Bird whistles and ultra sound detection reveal interesting code to language translations. Word capacity is increased by adding another channel to the system or by increasing the number of steps to the existing two channels.

The Speech Therapy Translator is made-up of two code channels and registers, a delay toggle and reset channel, a logic decoder, relays and a voice synthesizer. Channel #1 and channel #2 are the code channels. These code channels may be excited by DC switches or touch microphones. A code channel contains a pre-amplifier (amp-1), a second pre-amplifier (amp-2), a one-shot mono-stable multivibrator (OS-2) and a pulse amplifier-inverter (amp-6). The pulse amplifier-inverter feeds a dual JK Flip-Flop (FF). The dual JK Flip-Flop counts from 000 to 011 and by decade logic (7400 and 7404) is converted to 0 to 3. Outputs are provided for LEDs (light emitting diodes) and external code tuning. Channel #1 and channel #2 are identical. Channel #1 excites the TOP register and channel #2 steps the BOTTOM register.

BRIEF DESCRIPTION OF THE DRAWINGS

FIG. 3 is a block diagram of a single microphone connected to a preamplifier feeding two filters;

FIGS. 4a and 4b show a finger-motion actuated input block diagram;

FIGS. 6A 6B and 6C show charts of 15, 24, and 63 words respectively.

DESCRIPTION OF PREFERRED EMBODIMENT

Figure 1:
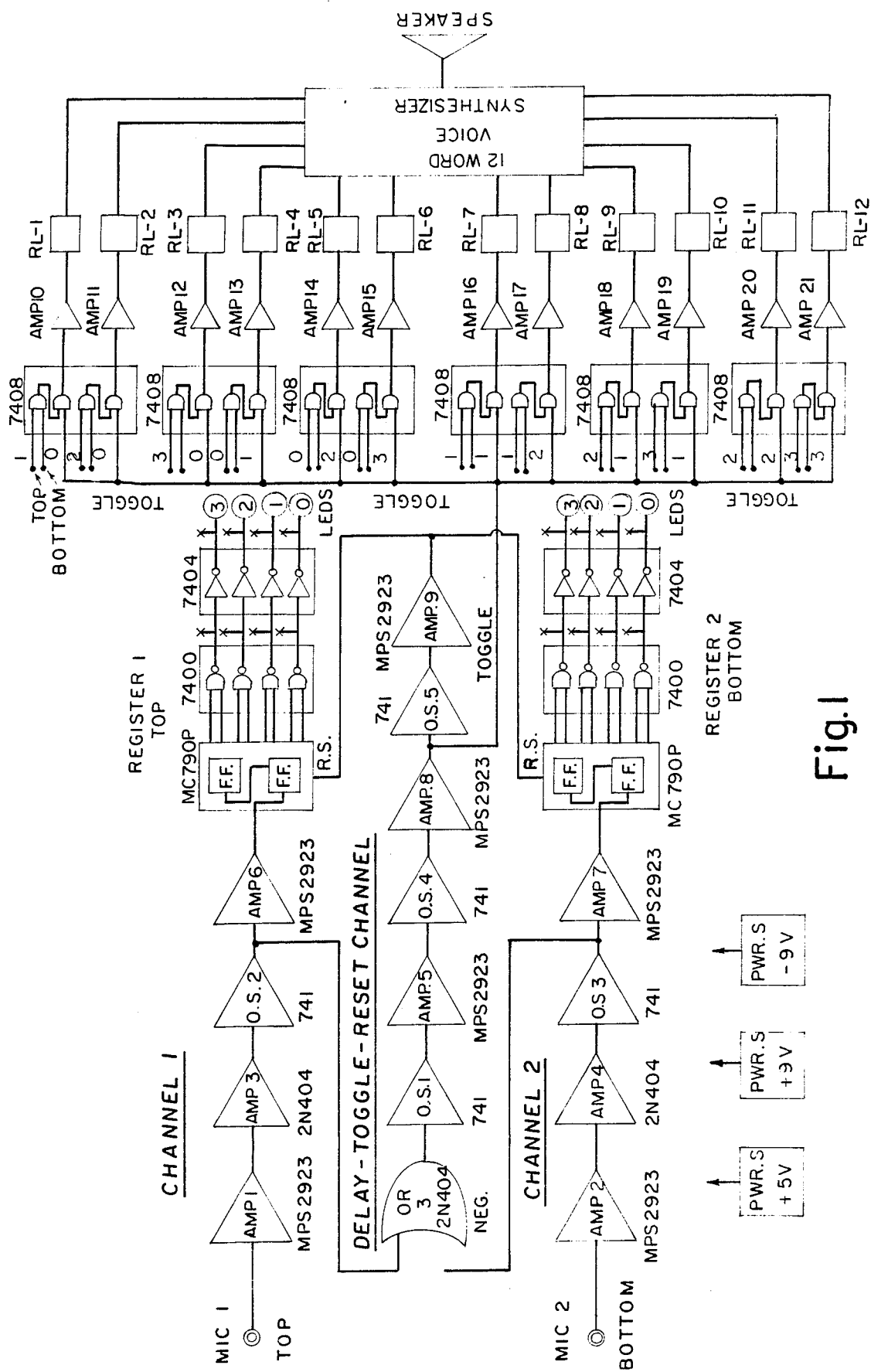
FIG. 1 is a block diagram and FIGS. 2a and 2b, a corresponding schematic diagram of the Speech Therapy Variable Code-Learning Translator embodying the present invention.
Figure 2A:
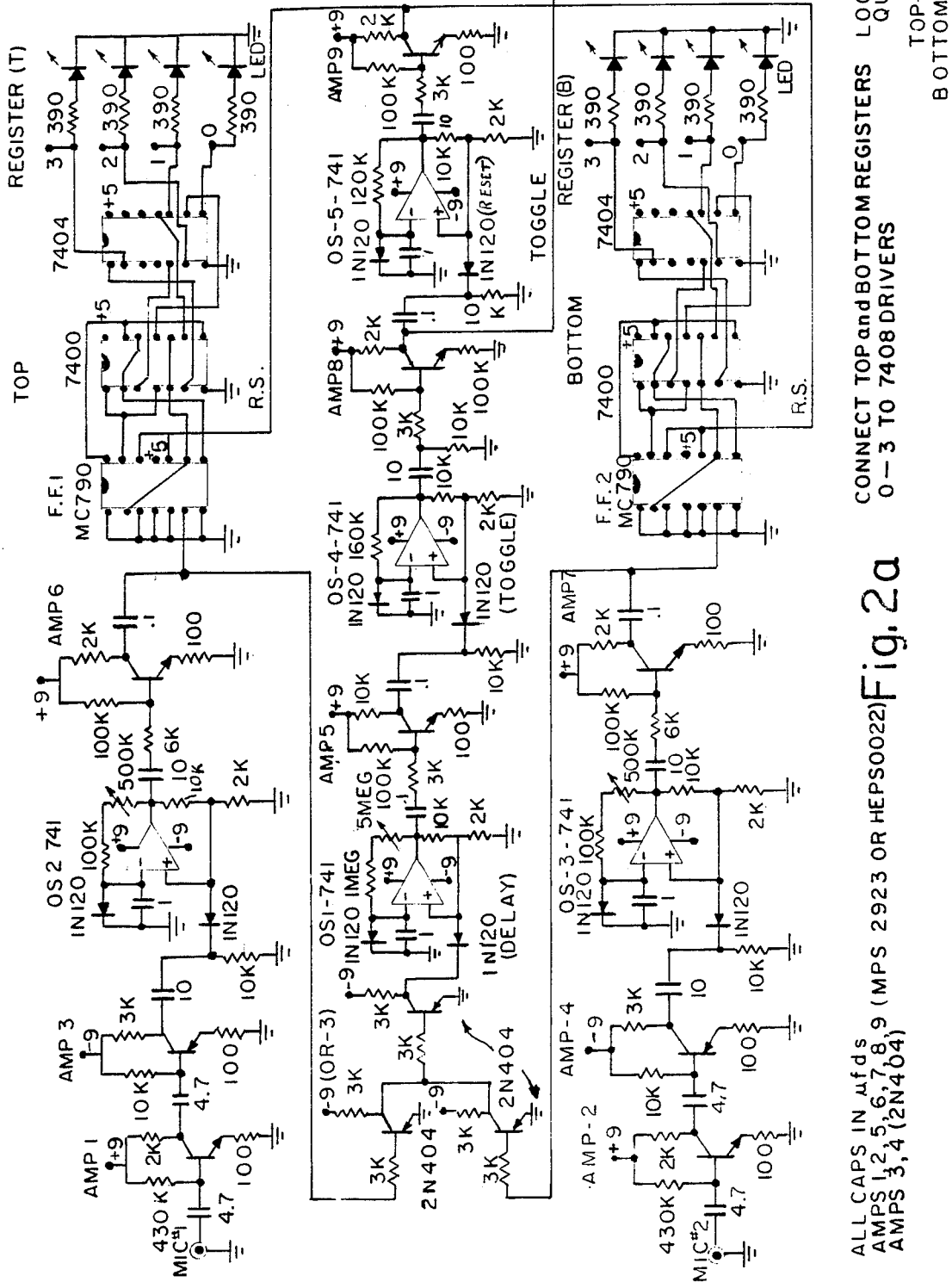

Referring to FIGS. 1 & 2, assume that touch microphones have been placed in the input circuits as in FIG. 4-B. Tapping microphone MIC #1 will step the TOP register. Tapping microphone MIC #2 will step the BOTTOM register. The double zero (00T) re-set positions of the registers does not enter into the code-word system. The first zero in the code is the re-set position of register #1. The second zero is the re-set position of register #2. The third character in the code, (T), is the toggle pulse which ANDs with all code combinations. Tapping the touch microphones in both channels will produce the following codes: TOP 1 BOTTOM 0, TOP 2 BOTTOM 0, TOP 3 BOTTOM 0, TOP 0 BOTTOM 1, TOP 0 BOTTOM 2, TOP 0 BOTTOM 3, TOP 1 BOTTOM 1, TOP 1 BOTTOM 2, TOP 2 BOTTOM 1, TOP 3 BOTTOM 1, TOP 2 BOTTOM 2, TOP 3 BOTTOM 3. These code combinations AND along with the TOGGLE (T) pulse to produce twelve words: 10T (I), 20T (SEE), 30T (YOU), 01T (ARE), 02T (O), 03T (K), 11T (AM), 12T (WE), 21T (YES), 31T (EGGS), 22T (PEE), 33T (AND). Using just the 3 bit two register system, the codes 13T, 23T and 32T will add three additional words. These additional words must be pre-programmed in the voice synthesizer.

When either channel is activated, the OR Circuit (OR-3) triggers one-shot #1. (OS-1) delays the re-set until the code of the word is completed. The 5 megohm potentiometer in OS-1 allows longer or shorter times to complete the codes. As the patient learns codes and reaction time quickens, the delay time may be shortened and the patient will talk faster. The trailing edge of the delay pulse will now drive OS-4 which generates the toggle pulse for AND coincidence along with the channel codes. OS-5 is driven by the trailing edge of the toggle pulse. OS-5 generates the re-set pulse to clear both registers to make-ready for a new code combination. The one megohm limiter in series with the 5 megohm potentiometer in OS-1 should be selected so that variation by the 5 megohm potentiometer will produce delay times between one and 3 seconds for one word formations.

The voice synthesizer may be a commercial speak and spell unit converted for the translator by arrangement. The synthesizer may also be a programmed chip from Texas Instruments or National Semiconductor Corporation. Special programmed synthesizers are necessary for larger word capacity. Word capacity is increased by adding another channel to the system or by increasing the number of steps in the existing two channels, or both.

All terminals in any code combination are assumed to be 3 to 5 volts. This level is necessary to activate the AND circuits properly. FIG. #1 is a block diagram of the Speech Therapy Translator. FIG. #2 is the schematic diagram. The logic for word selection is contained in the six 7408 Quad-And circuits. The first and third AND circuits of the 7408s receive the code combinations. The second and fourth AND circuits receive the outputs of the code combinations and the toggle pulse. These outputs drive amplifiers 10 through 21, which drive Relays 1 through 12. The relay switch contacts may be soldered to the switch connections of a Speak and Spell Voice Synthesizer, a pre-programmed Texas Instruments, or a National Semiconductor Voice Synthesizer. FIG. 4-B shows the microphone connections for the system. FIG. 4-A shows the positions of the fingers for tap operation.

Figure 5A:
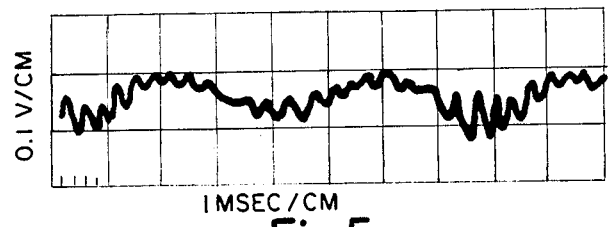
FIGS. 5a and 5b show oscillographs of "e" and "uh" sounds respectively.
Figure 5B:
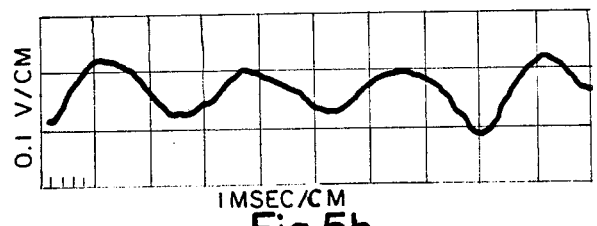

FIG. 3 shows a one-microphone connection to a pre-amplifier feeding two filters. The operational amplifier filters select pre-determined aural spectra for sound to be used. It previously has been noted that clicking sounds could be used instead of tapping microphones, but there must be directivity during the two-channel excitation. This third mode uses only one microphone and the channels are selective due to the frequency differential of sounds made by the patient. Two sounds have been analyzed extensively for this mode. The sound (e) and the sound (uh) are basically monkey sounds. The sounds (e) and (uh) were selected because of the spread of their frequencies for ease of tuning and minimum cross-talk. Oscillograms have revealed that the sound (e) has from 2.5 khz to 3.5 khz content as shown in FIG. 5A. The sound (uh) has 250 hz to 350 hz content. These two ranges are filtered by filters 1 and 2 in FIG. 3. The patient may step the registers in the translator by uttering the sounds (e) and (uh). There is some aural spectrum analysis necessary to determine patients differentiating sounds. Once this analysis is complete, the filters may be tuned. FIG. 5B shows an oscillogram for the (uh) sound. One-shots OS-2 and OS-3 may be adjusted to encompass sound trails which would multi-trigger registers.

An experimental model uses Magnecraft W102MX-2, 200 ohm 6-volt DC Relays. With larger word capacities, solid state relays are used to conserve space.

Word capacity is increased by increasing the number of data channels and by increasing the number of steps per channel $T=N^x-1$; where T equals the total number of words, N is the number of steps per channel and x is the number of channels.

FIG. 6A shows a code chart for the four strap, two channel system. The number of levels or steps is the base number 4. The exponent 2 is the number of channels. Since the code 00 is reset, the word capacity for FIG. 6A is 15 words. The voice synthesizer contains only 12 words, codes 13, 23 and 32 are not used. A voice synthesizer with 15 words must be added to make full use of this combination.

FIG. 6B shows how word capacity may be increased. The system in 6B uses 2 channels and 5 levels or steps. Five squared is 25, less re-set (00) yields a 24 word system. A synthesizer with 24 words must be added.

FIG. 6C shows a 63 word capacity system. The system uses three channels, with four levels or steps in each channel. Four cubed is 64, less re-set (00) yields a 63 word system. A synthesizer with 63 words must be added.

Thus it will be seen that I have provided a novel immediate, word-by-word speaking translator for speech handicapped persons and those speech handicapped having sight loss, comprising a circuit having a pair of inputs, each feeding a separate code-data channel and code register, a voice synthesizer in the output of said registers, and means to step said registers to feed logic and select predetermined words in said voice synthesizer controlled by a common control channel (fed by data channels), which delays, toggles and resets the system.

While I have illustrated and described several embodiments of my invention, it will be understood that these are by way of illustration only and that various changes and modifications may be contemplated in my invention and within the scope of the following claims.

I claim:

1. An immediate, word-by-word speaking translator for speech handicapped persons and those speech handicapped having no sight, comprising a circuit having a pair of inputs, each feeding a separate code-data channel and code register,. said code-data channels utilizing a simplified machine language $T=N^X-1$ WHERE X equals number of data channels; N=steps per channel; and T equals total number of words, said machine language being injected through code input impulses from said handicapped persons fed into a filter system, an automatic control channel and a voice synthesizer; whereby said code input pulses and automatic control channel adapt easily to physical disabilities of said handicapped persons.

2. A circuit as recited in claim 1 wherein said channels automatically delay, toggle and reset said circuit.

3. A translator as recited in claim 1 wherein said inputs are switches operated by movement of body parts of the handicapped persons which build proper codes to select proper words.

4. A translator as recited in claim 1 wherein said inputs are microphones which receive coded tones to select proper words.

5. A translator as recited in claim 1 wherein said input comprises pulses in the voice-sound, mode, wherein said filter system selects two narrow frequency ranges for two different frequency sounds increasing the number of total words.

6. A translator as recited in claim 5 wherein said two sounds are about "e" 3000 HZ and "uh" 300 HZ.

7. A translator as recited in claim 5 wherein said filter system filters a plurality of select tone codes for word translation.

8. A translator as recited in claim 1 wherein said input comprises pulses created by a plurality of D. C. switches responsive to movable portions of the human body generating a simple machine language for decoding, instantly, scores of voice synthesized words.

9. A translator as recited in claim 1 and wherein said inputs are microphones energized from taps or directional audio clicks.

10. A translator as recited in claim 1 wherein said circuit includes variable time delay means, dependent upon patient response capabilities, -- which delay time decreases as the patient improves during the learning process and the patient's speaking speed increases.

11. A translator as recited in claim 1 together with a crossover facility including analyzed oscillograms, selected frequencies and tuned filters to begin the speaking phase of recovery, and having the capability for utterance frequency selection, the system code language allowing for variables of tones a handicapped person may generate due to condition, data yields differing by altering circuit adjustment.

12. A translator as recited in claim 1 having adaptability to voice synthesizer pre-programmed memory with unlimited word capacity in accordance with the formula $T=N^x-1$ wherein:
T=Number of words
N=Number of steps
x=Number of channels,
whereby word capacity is increased by increasing the number of data channels and by increasing the number of steps per channel.

13. A translator as recited in claim 12, including a standard code-word system for translating the channel step method into the English language, similar to the Morse Code, for letters, including the words: ARE, O,K, I, AM, WE, SEE, YES, PEE, YOU, EGGS and AND.

14. A translator as recited in claim 1 together with variable code means and being capable of investigations in insect, fish, bird, and all animal sound repetition rates and delays for language translation in the field of linguistic anthropology.

15. A translator as recited in claim 1 wherein said circuit is sufficiently flexible as to change languge and coding for all existing languages, the code language being basic and changing of codes being simple for variations of words.

16. A translator as recited in claim 1 wherein said input is initiated by variations in switch excitation, finger movement, hand movement, foot movement, eye movement, tap and voice activated methods in phase time and filtered tones.

17. A translator as recited in claim 1 wherein the basic "e" and "uh" sounds for monkey type translation are at 250 HZ to 350 HZ for "uh" and 2.5 KHZ to 3.5 KHZ for "e" by stepping said registers for word decoding and wherein each utterance of a tone represents a unit form of data.

18. A speech therapy immediate translator for speech handicapped persons comprising a circuit having a pair of microphones inputs, each feeding one of a pair of code channels excited by input pulses from said handicapped persons, each channel comprising pre-amplifier means, one-shot monostable multivibrator means and pulse amplifier inverter means; and means fed by said pulse amplifier inverter means and including a pair of registers, one for each of said channels, and voice synthesizer means fed by said registers, for translating said input pulses to said code channels to conversation without requiring the sight sense of said handicapped persons.

19. A translator as recited in claim 18 wherein said means fed by said pulse amplifier inverter means is a dual flip-flop which counts from 000 to 011 and by decade logic (7400 to 7404) is converted tó 0 to 3.

20. A translator as recited in claim 18 including means for varying phase time and circuit for coding word selection in more complex translations.

21. The method of instantly translating signals from speech handicapped persons to audible words, which method involves providing at least two code channels, each having an input, exciting said inputs with pulses from movements or sounds from said persons, amplifying said pulses, entering them in said code channels, stepping said pulses in at least two registers, feeding a voice synthesizer with data from said registers, and sounding said selected words in a loudspeaker.

* * * * *